United States Patent

Henderson

[15] 3,687,112
[45] Aug. 29, 1972

[54] ANTI-CRIBBING DEVICE FOR HORSES

[72] Inventor: Gary A. Henderson, Fourth & Main St., Ellensburg, Wash. 98926

[22] Filed: Sept. 3, 1970

[21] Appl. No.: 69,243

[52] U.S. Cl. .................119/29, 119/106, 119/130
[51] Int. Cl. .......................A01k 15/00, A01k 27/00
[58] Field of Search..........119/29, 108, 27, 130, 106; 231/2 E

[56] References Cited

UNITED STATES PATENTS

| | | | |
|---|---|---|---|
| 487,461 | 12/1892 | Whitefield | 119/108 |
| 2,628,592 | 2/1953 | Johnston | 119/130 |
| 2,176,994 | 10/1939 | Hansen et al. | 231/2 E |
| 2,510,337 | 6/1950 | Franklin | 119/130 |
| 2,658,478 | 11/1953 | Jones | 119/130 |
| 2,783,740 | 3/1957 | Haggard | 119/130 |
| 2,940,425 | 6/1960 | Dykens | 119/130 |
| 2,996,043 | 8/1961 | Pettingill | 119/131 |

Primary Examiner—Aldrich F. Medbery
Attorney—Ford E. Smith

[57] ABSTRACT

Cribbing and windsucking preventor for horses is provided by a strap encircling the throat to hold electrodes or prods at opposite sides. A U-shaped former is slidingly associated with the strap and fits to the horse's windpipe. The former keeps the strap from closing the windpipe when the throat is swelled as by cribbing and concentrates force applied to stretch the strap on a supersensitive ribbon switch which closes to complete an electric shocking circuit including said prods and current generating apparatus.

4 Claims, 2 Drawing Figures

PATENTED AUG 29 1972

3,687,112

INVENTOR.
GARY A. HENDERSON
BY Ford E. Smith
ATTORNEY

ANTI-CRIBBING DEVICE FOR HORSES

SUMMARY OF THE INVENTION

Background

Cribbing and windsucking have long been recognized as vicious and harmful habits in horses. Cribbing occurs when a horse takes the edge of his manger or any other projection between his teeth and makes motions appearing to tear at the gripped member. A commonly noted condition resulting from cribbing is a bevelling of the horse's teeth. Often the animal is internally upset, and not a good feeder whereupon undue thinness a poor body tone become evident. Windsucking occurs when a horse breathes forcibly through the mouth and gulps air into the digestive tract. Cribbing and windsucking often go together. The cribbing horse having its mouth open can also windsuck, thus combining two bad habits. It is noted that when a horse cribs or windsucks, it swells the muscles at the sides of the throat causing a distension that results in a larger circumferential dimension of the throat.

In the past numerous efforts have been made to provide harness, straps, and other devices designed to punish the animal when it cribs and windsucks. The Christesen 1891 U.S. Pat. No. 464,854 shows a mechanically operable device in which, when the horse distends his throat muscles, pointed prods are caused to be driven into the animal's throat in the region of the windpipe. These are not considered particularly effective because they are relative slow-acting and do not punish with sharp severity. Electrical shocking devices have also been known as, for example, that shown in Whitefield's 1892 U.S. Pat. No. 487,461 in which an electrically conductive plate is pressed, when the animal swells its throat, into conductive relation with two spaced apart contacts. Current flows through the plate which is against the animal's throat and two spaced sponge tipped electrodes are energized. A primary problem with prior electrical training devices has been their lack of sensitivity and, in particular, their inability to operate almost immediately upon the initiation of throat-swelling and before a substantial force is credited. It is believed that the more quickly the effect of throat swelling that accompanies cribbing and windsucking can be detected and a punishing electrical shock applied, the sooner the habits will be counteracted and broken.

THE INVENTION

Swelling or distension of a horse's throat muscles tends to stretch a strap closely encircling the throat of the animal. The tendency of the strap to stretch produces forces of a low order that, by being concentrated and localized can be employed to operate a simple ribbon switch carried by the strap. The switch closes to complete an electrical circuit to apply shocking energy to throat engaging probes. Concentration and localization of such force is obtained by supplying a U-shaped former for said strap and switch located in straddling relation to the windpipe and operable to prevent the latter from being closed under ordinary circumstances while insuring almost instantaneous closure of said switch when a horse begins to crib.

DESCRIPTION OF THE INVENTION

Figure 1:
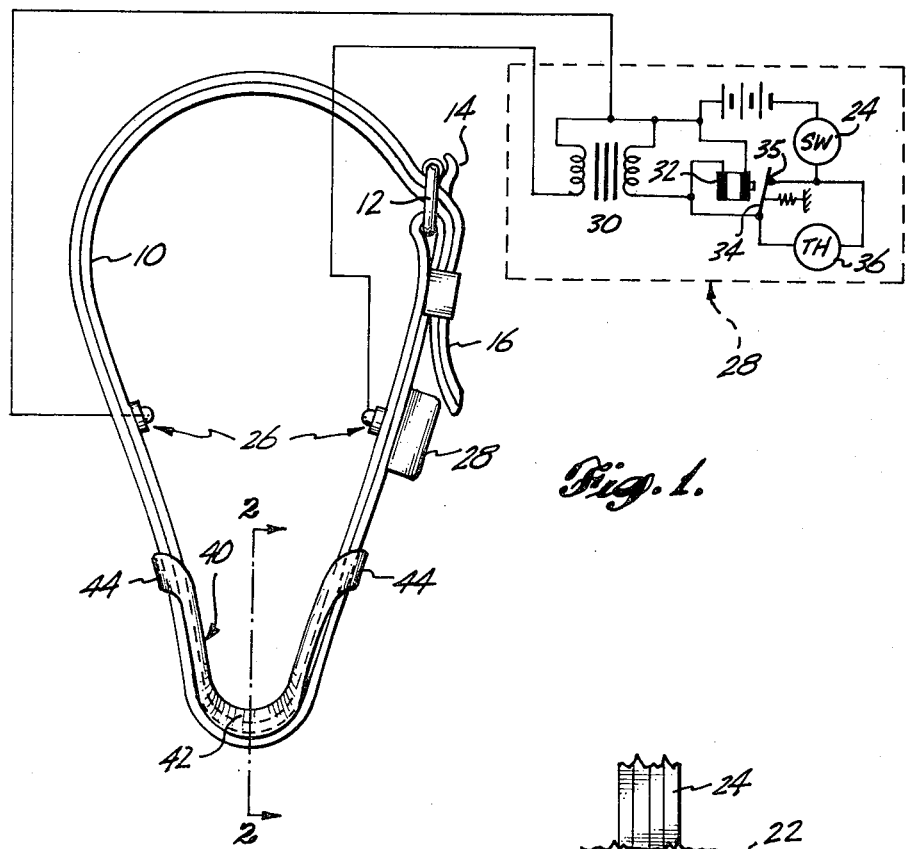
FIG. 1 is a front view of the device including an electrical diagram of the circuit used.
Figure 2:
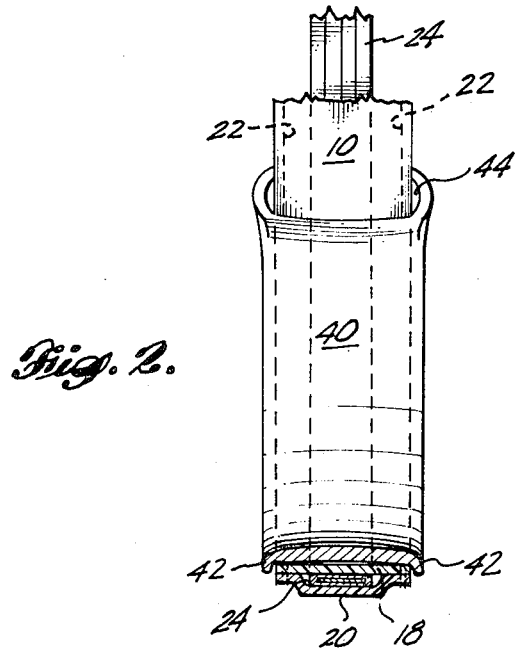
FIG. 2 is an enlarged fragmentary sectional view on line 2—2 of FIG. 1.

Throat encircling strap 10 has a buckle 12 including a tongue 14 which engages in the usual manner a hole in the free end 16 whereby to secure the strap about a horses's throat. Preferably strap 10 is formed of two parts 18,20 secured together at their edges throughout their lengths as by stitchings 22.

Between a strap parts 18,20 in the lower portion of the encircling strap is placed the elongated ribbon switch 24 which extends in U-shape up each side of strap 10. Conductor wires forming part of a circuit to be described are also located between parts 18,20. The ribbon switch comprises a pair of spaced apart metallic ribbons which when pressed together close a circuit to probes 26,26.

Mounted in strap 10 in the opposite areas that lie along both sides of a horse's neck are electrodes or prods 26,26. Power pack housing 28 contains transformer 30, magnetic coil 32, vibrator 34, therminal switch 36 (a thermistor preferably) and battery 38, the ribbon switch 24 being shown as part of the diagram.

When switch 24 is closed, current flows through coil 32 energizing it to create a magnetic field attracting switch arm 34 causing it to break with contact 35. This operation is repetitive since breaking the circuit through contact 35 breaks the circuit to coil 32, whereupon the arm swings back to its normal contact position. Opening and closing of switch 34,35 produces a pulsating DC current across the primary winding of transformer 30 and results in a stepped up voltage output at the secondary winding which is applied to electrodes 26,26 in contact with the animal at opposite sides of its neck. The animal is thus subjected to a rapid series of shocks so long as the animal distends his neck muscles causing the closing of switch 24.

As a precaution operable in the event the animal fails to relax its neck muscles or switch 24 fails to open, decreased resistance of thermistor 36 causes the latter to open and interrupt current flow. Thermal switch 36 is in a by-pass circuit around switch 34,35 and operates cumulatively as it heats in response to prolonged and protracted current surges and finally opens.

The wind-pipe protector U-shaped yoke or former 40 is a rigid member and is located inside the loop of strap 10 in the lower portion and adjacent an animal's windpipe. In the preferred form shown, former 40 has flanged edges 42 that aid in maintaining location and loops 44 that encircle strap 10. The function of former 40 is to distribute applied pressures on the throat at the sides generally above but without constricting the windpipe and to concentrate such pressures on the ribbon switch 24. It has been found that pressures of the strap as low as 2 and½ pounds (produced by the horse distending its throat muscles and tending to stretch strap 10) will operate the ribbon switch 24 when former 40 is included. On the other hand, even though switch 24 will operate at said 2 and ½ pound level, much greater muscle distension is required when the former 40 is not included to receive and guide the strap and protect the wind pipe.

It will be apparent that modifications and alterations of the present structure may be made. All such as fall within the scope and spirit of the following claims, giving due and proper regard to an appropriate application of the doctrine of equivalents are intended to be covered by this patent.

What is claimed is:

1: An shock applying anti-cribbing device for horses, comprising:
- a detachable throat-encircling strap including housing means containing a coil and vibrator unit and battery means;
- a pair of prods instanding from said strap at opposite medial sides of the strap
- rigid U-shaped wind-pipe protecting former means slidingly associated with said strap internal thereto, said rigid former means being shaped to snugly receive a horse's windpipe;
- an elongated ribbon switch mounted between said strap and said former in the region of the windpipe of a horse, said ribbon switch extending beyond the ends of said former above the wind-pipe and being operable upon the application of swelling pressure applied to said strap; and
- electrical conductor means operably connecting said prods, battery means, ribbon switch means, and coil and vibrator unit in circuit.

2: A device according to claim 1 in which the strap is two-layered, edge joined and said ribbon switch is disposed between said layers.

3: A device according to claim 1 in which a thermally operable timing element is included in the circuit.

4: A device according to claim 1 in which said former has loops at its ends which slidingly receive said strap, said former being externally channeled between said loops and embracing edges of said strap.

* * * * *